US008694015B2

(12) United States Patent
Hsiao (10) Patent No.: US 8,694,015 B2
(45) Date of Patent: Apr. 8, 2014

(54) NETWORK SYSTEM, FEMTOCELL, FEMTOCELL MANAGEMENT APPARATUS, RESOURCE ALLOCATION METHOD AND NON-TRANSITORY MACHINE-REDABLE MEDIUM THEREOF (75) Inventor: Chiu-Han Hsiao, New Taipei (TW)

(73) Assignee: Institute for Information Industry, Taipei (TW)

( * ) Notice: Subject to any disclaimer, the term of this patent is extended or adjusted under 35 U.S.C. 154(b) by 267 days.

(21) Appl. No.: 13/172,819

(22) Filed: Jun. 29, 2011

(65) Prior Publication Data

US 2012/0282943 A1 Nov. 8, 2012

(30) Foreign Application Priority Data

May 2, 2011 (TW) .............................. 100115305 A (51) Int. Cl.
H04W 72/00 (2009.01)
(52) U.S. Cl.
USPC ........ 455/452.1; 455/437; 455/450; 455/458; 455/435.1; 455/444; 455/449; 455/438; 455/422.1; 455/41; 455/411
(58) Field of Classification Search
USPC ........... 455/437, 452.1, 450, 458, 501, 456.5, 455/435.1, 444, 449, 438, 422.1, 411, 410
See application file for complete search history.

(56) References Cited

U.S. PATENT DOCUMENTS

2009/0181688 A1* 7/2009 Claussen et al. .............. 455/450
2009/0296641 A1  12/2009 Bienas et al.
2010/0113035 A1* 5/2010 Eskicioglu et al. ........... 455/444
2010/0144338 A1* 6/2010 Kim et al. ................. 455/422.1
2010/0248730 A1* 9/2010 Han et al. ...................... 455/450
2012/0002636 A1* 1/2012 Xiao et al. ..................... 370/329
2012/0064900 A1* 3/2012 Thadasina et al. ............ 455/446
2012/0142364 A1* 6/2012 Duan ............................. 455/450
2012/0155291 A1* 6/2012 Koivisto et al. ............... 370/252

(Continued)

FOREIGN PATENT DOCUMENTS

EP 2259613 A1 9/2007
EP 2104386 A1 9/2009

(Continued)

OTHER PUBLICATIONS

Office Action rendered by United Kingdom Intellectual Property Office (UKIPO) for the United Kingdom counterpart of the subject patent application on Nov. 1, 2011, 7 pages.

(Continued)

Primary Examiner — Joseph Arevalo
(74) Attorney, Agent, or Firm — Skaar Ulbrich Macari, P.A.

(57) ABSTRACT

A network system, a femtocell, a femtocell management apparatus, a resource allocation method and a computer program product thereof are provided. The network system comprises a piece of user equipment, a femtocell and a femtocell management apparatus. The user equipment is configured to transmit a request. The femtocell communicates with the user equipment and is configured to receive the request and establish an interference figure. The femtocell management apparatus communicates with the femtocell and is configured to receive the request and the interference figure and perform resource allocation to allocate a resource block to the request signal according to the request and the interference figure so that the femtocell and the user equipment may perform signal transmission according to the resource block.

15 Claims, 6 Drawing Sheets

(56) References Cited

U.S. PATENT DOCUMENTS

| | | | |
|---|---|---|---|
| 2012/0201159 A1* | 8/2012 | Morita et al. | 370/252 |
| 2012/0252435 A1* | 10/2012 | Bienas et al. | 455/422.1 |
| 2012/0252521 A1* | 10/2012 | Nagaraja et al. | 455/522 |
| 2012/0269084 A1* | 10/2012 | Okubo et al. | 370/252 |
| 2012/0306693 A1* | 12/2012 | Edge | 342/357.29 |
| 2012/0322466 A1* | 12/2012 | Das et al. | 455/458 |
| 2013/0029676 A1* | 1/2013 | Guvenc et al. | 455/450 |

FOREIGN PATENT DOCUMENTS

| | | |
|---|---|---|
| EP | 2117243 A1 | 11/2009 |
| WO | WO 2010/081696 A1 | 7/2010 |
| WO | WO 2010/098573 A2 | 9/2010 |
| WO | WO 2010/107264 A2 | 9/2010 |
| WO | WO 2010/111006 A1 | 9/2010 |
| WO | WO 2010/121825 A1 | 10/2010 |
| WO | WO 2011/071470 A1 | 6/2011 |

OTHER PUBLICATIONS

Office Action rendered by Taiwan Intellectual Property Office (TIPO) for the Taiwan counterpart of the subject patent application, Aug. 30, 2013, 7 pages.

* cited by examiner

NETWORK SYSTEM, FEMTOCELL, FEMTOCELL MANAGEMENT APPARATUS, RESOURCE ALLOCATION METHOD AND NON-TRANSITORY MACHINE-REDABLE MEDIUM THEREOF

PRIORITY

This application claims priority to Taiwan Patent Application No. 100115305 filed on May 2, 2011, which is hereby incorporated herein by reference in its entirety.

FIELD

The present invention relates to a network system, a femtocell, a femtocell management apparatus, a resource allocation method and a computer program product thereof. More particularly, the present invention relates to a network system, a femtocell, a femtocell management apparatus, a resource allocation method and a computer program product thereof for allocating a resource block.

BACKGROUND

Owing to wide application of the wireless communication technologies, use of various mobile apparatuses becomes increasingly widespread. Accordingly, the number of users becomes increasingly larger and requirements on wireless communication quality become ever heightened. This drives the wireless communication technologies to advance continuously. Among various wireless communication technologies, the most promising mobile wireless wideband technology is the Long Term Evolution (LTE) technology, which allows service providers to provide wireless wideband services in a more economical way and has performance superior to the existing $3^{rd}$-generation (3G) mobile communication technology.

In an LTE network, femtocells are deployed to extend coverage of wireless signals, to allow for network access in indoor environments and to improve the quality of service (QoS) in the indoor environments. However, in areas where femtocells are densely distributed, significant interference inevitably arises between the femtocells, which will seriously degrade the communication quality. Therefore, how to solve the problem of interference has become an important issue.

Generally speaking, an intuitive approach to avoid interference between the femtocells is to allocate different wireless resources to requests from different users so as to prevent occurrence of interference. Currently, all conventional technologies allocate wireless resources and revise use of the wireless resources through massive computations and frequent sensing operations performed by the femtocells. This has the following disadvantages: (1) the computational burden on the femtocells is very heavy; (2) additional cost (in terms of CPUs, memories and etc) is needed for the femtocells to make complex computations; (3) there is difficulty in resource allocation in areas where femtocells are densely distributed; (4) they fail to provide a mechanism of serving a large number of connections; (5) there lacks a design of guaranteeing the quality of service (QoS); (6) it is impossible to guarantee that the resources allocated are safe and immune to interference.

Accordingly, an urgent need exists in the art to provide a network system and a resource allocation method that can lower the cost of femtocells, allow for a high reusing rate of wireless frequency bands and dynamically allocate wireless resources in a flexible way.

SUMMARY

An objective of certain embodiments of the present invention is to provide a network system. The network system comprises a user equipment, a femtocell and a femtocell management apparatus. The user equipment is configured to transmit a request signal. The femtocell communicates with the user equipment and is configured to receive the request signal to establish an interference figure. The femtocell management apparatus communicates with the femtocell, and is configured to receive the request signal and the interference figure, and perform resource allocation to allocate a resource block to the request signal according to the request signal and the interference figure so that the femtocell and the user equipment perform signal transmission according to the resource block.

Another objective of certain embodiments of the present invention is to provide a femtocell. The femtocell is adapted to communicate with at least one neighbor femtocell, and comprises a transceiving unit and a processing unit. The transceiving unit is configured to transmit a broadcast signal to the at least one neighbor femtocell so that the at least one neighbor femtocell transmits a feedback signal to the femtocell in response to the broadcast signal. The processing unit is configured to establish an interference figure according to the feedback signal. The interference figure records a distance between the at least one neighbor femtocell and the femtocell.

Yet another objective of certain embodiments of the present invention is to provide a femtocell management apparatus. The femtocell management apparatus is adapted to communicate with a femtocell, and comprises a transceiving unit and a processing unit. The transceiving unit is configured to receive a request signal and an interference figure from the femtocell. The processing unit is configured to perform resource allocation to allocate a resource block to the request signal according to the request signal and the interference figure so that the femtocell performs signal transmission according to the resource block.

Still another objective of certain embodiments of the present invention is to provide a resource allocation method for the aforesaid network system. The network system comprises a user equipment, a femtocell and a femtocell management apparatus. The femtocell is adapted to communicate with the user equipment and the femtocell management apparatus respectively. The user equipment transmits a request signal to the femtocell. The resource allocation method comprises the following steps of: (a) enabling the femtocell to establish an interference figure; (b) enabling the femtocell to transmit the request signal and the interference figure to the femtocell management apparatus; and (c) enabling the femtocell management apparatus to perform resource allocation to allocate a resource block to the request signal according to the request signal and the interference figure so that the femtocell and the user equipment perform signal transmission according to the resource block.

Yet a further objective of certain embodiments of the present invention is to provide a computer program product, which stores a program of a resource allocation method for a network system. The network system comprises a user equipment, a femtocell and a femtocell management apparatus. The femtocell is adapted to communicate with the user equipment and the femtocell management apparatus respectively. The user equipment transmits a request signal to the femtocell. The program comprises: a code A for enabling the femtocell to establish an interference figure; a code B for enabling the femtocell to transmit the request signal and the interference figure to the femtocell management apparatus; and a code C for enabling the femtocell management apparatus to perform resource allocation to allocate a resource block to the request signal according to the request signal and the interference figure so that the femtocell and the user equipment perform signal transmission according to the resource block.

According to the above descriptions, the network system of the present invention uses the femtocell to establish an interference figure and transmit the interference figure and a request signal, which is transmitted by a user, to the femtocell management apparatus. Then, the femtocell management apparatus performs resource allocation to allocate a resource block to the request signal according to the request signal and the interference figure so that the femtocell and the user equipment can perform signal transmissions according to the resource block. Thereby, the present invention can overcome the problems with the prior art that the femtocell bears a heavy computational burden and requires additional cost for making complex computations and that it is impossible to effectively allocate resources in areas where femtocells are densely distributed. Meanwhile, the present invention can advantageously reduce the cost of the femtocell, improve the utilization factor of resources in the whole network and process a large amount of request signals.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
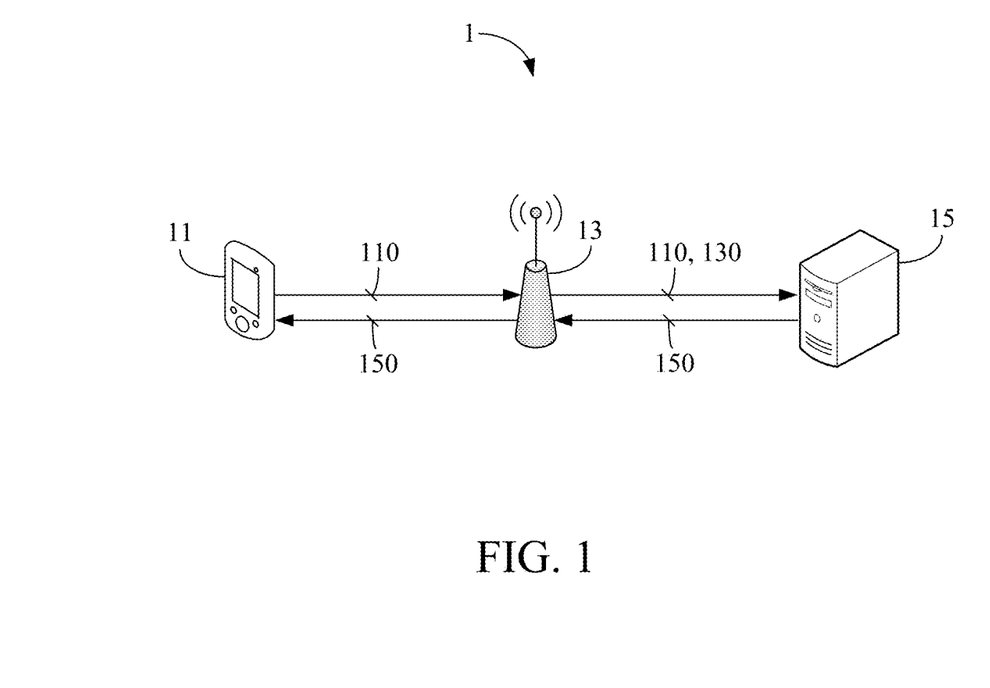
FIG. 1 is a schematic view of a first embodiment of the present invention.

A first embodiment of the present invention is a network system 1, a schematic view of which is shown in FIG. 1. The network system 1 comprises a user equipment 11, a femtocell 13 and a femtocell management apparatus 15. The user equipment 11 communicates with the femtocell 13 wirelessly, and the femtocell 13 communicates with the femtocell management apparatus 15 either wirelessly or in a wired way.

Figure 2:
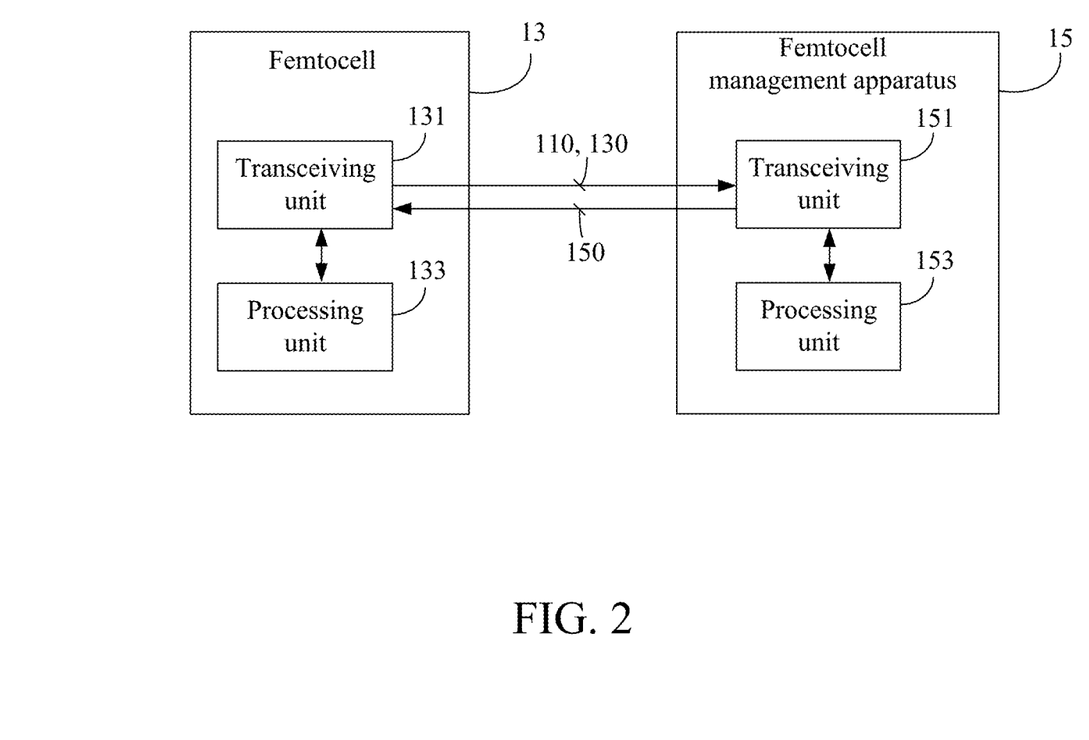
FIG. 2 is a schematic view of a femtocell and a femtocell management apparatus according to certain embodiments of the present invention.

Referring to FIG. 2, there is shown a schematic view of the femtocell 13 and the femtocell management apparatus 15. The femtocell 13 comprises a processing unit 133 and a transceiving unit 131 electrically connected to the processing unit 133. The femtocell management apparatus 15 comprises a processing unit 153 and a transceiving unit 151 electrically connected to the processing unit 153. The transceiving unit 131 is electrically connected to the transceiving unit 151 either wirelessly or in a wired way.

Firstly, how the femtocell 13 of the present invention establishes an interference figure will be described. In a real-world environment, there may be one or more neighbor femtocells within coverage of the femtocell 13. Because coverage of the neighbor femtocells overlaps with that of the femtocell 13, interference in communication may arise when the femtocell 13 and the neighbor femtocells perform signal transmissions respectively. In order to avoid the problem of interference, the femtocell 13 must establish an interference figure for recording relative distances between the femtocell and the neighbor femtocells.

After being powered on, the femtocell 13 firstly registers with the femtocell management apparatus 15; then, the femtocell 13 transmits a broadcast signal via the transceiving unit 131. In order to cover neighbor femtocells within a larger area, the femtocell 13 transmits the broadcast signal at a doubled power level; i.e., the broadcast signal can be transmitted to a doubled distance. When one or more neighbor femtocells around the femtocell 13 receive the broadcast signal, each of the neighbor femtocells transmits a feedback signal to the femtocell 13 so that the processing unit 133 of the femtocell 13 can learn an identification (ID) of the neighbor femtocell and measure a distance between the neighbor femtocell and the femtocell 13 according to the feedback signal. Finally, the femtocell 13 establishes an interference figure according to the detection result.

Figure 3:
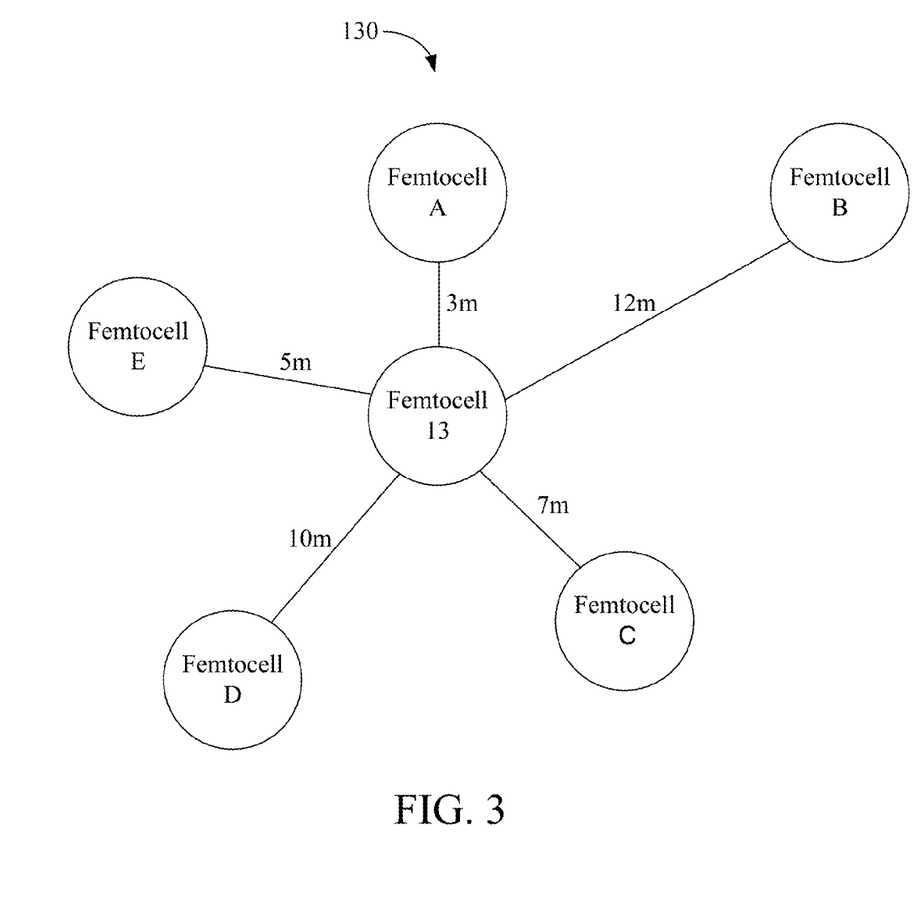
FIG. 3 is a schematic view depicting an interference figure established by the femtocell.

Referring to FIG. 3, there is shown a schematic view of an interference figure established by the femtocell. The interference figure 130 records that there are five neighbor femtocells within an area around the femtocell 13, IDs of which are Femtocell A to Femtocell E respectively. The interference figure 130 also records distances between the femtocell 13 and the individual neighbor femtocells. For example, a distance between the femtocell A and the femtocell 13 is 3 meters, and so on. Thus, the IDs of and the distances from the neighbor femtocells around the femtocell 13 can be learned from the interference finger 130.

It shall be particularly noted that, in this embodiment, the femtocell 13 transmits the broadcast signal at a doubled power level to detect neighbor femtocells within a doubled communication distance; however, in other embodiments, the femtocell may also transmit the broadcast signal at an arbitrary power level to detect neighbor femtocells around the femtocell 13. Therefore, the range of the detection area is not intended to limit the scope of the present invention.

When the user equipment 11 needs to use a wireless network resource, the user equipment 11 transmits a request signal 110 to the femtocell 13. The request signal 110 comprises a request bandwidth and a request quality of service (QoS) class identifier (QCI). The request bandwidth indicates a wireless network bandwidth requested by the user equipment 11, and the QCI indicates the QoS class requested by the user equipment 11.

Upon receiving the request signal 110, the transceiving unit 131 of the femtocell 13 transmits the request signal 110 to the processing unit 133. Then the processing unit 133 determines whether the femtocell 13 can provide the bandwidth and the QoS class requested by the request signal 110. If "no", it means that the femtocell 13 is unable to provide the service requested by the request signal 110; in this case, the processing unit 133 discards the request signal 110, i.e., the femtocell 13 will not provide the wireless network resource to the user equipment 11. Otherwise, if "yes", then the processing unit 133 proceeds to make a next determination.

The femtocell 13 further stores a queue, which is used to schedule the pending service requests transmitted to the femtocell 13. Specifically, in case of a high load, it is possible that the femtocell 13 receives service requests from a plurality of UEs simultaneously. In this case, the processing unit 133 can temporarily store these service requests into the queue, and then process the service requests sequentially according to priority levels of the service requests.

On the other hand, the request signal 110 further has waiting time $D_{QCI(110)}$, which represents allowable waiting time of the request signal 110. The waiting time $D_{QCI}$ is determined by the QCI of the request signal, and different QCIs correspond to different waiting time $D_{QCI}$. Generally speaking, a higher QoS class has shorter allowable waiting time; conversely, a lower QoS class has longer allowable waiting time.

After having determined that the femtocell 13 can provide the bandwidth and the QoS class requested by the request signal 110, the processing unit 133 firstly calculates a queue waiting period, which represents time that will be taken by the femtocell 13 to process all the pending service requests. Next, the processing unit 133 determines whether the waiting time $D_{QCI(110)}$ is not less than (i.e., greater than or equal to) the queue waiting period. If "no", it means that the femtocell 13 is unable to process the request signal 110 within the waiting time $D_{QCI(110)}$ and, then, the processing unit 133 discards the request signal 110. Otherwise, if "yes", it means that the femtocell 13 is able to process the request signal 110 within the waiting time $D_{QCI(110)}$.

It shall be further noted that, in the LTE specification, wireless network resource requests may be divided into two primary categories: Guaranteed Bit Rate (GBR) service requests and non-Guaranteed Bit Rate (non-GBR) service requests. For example, a service request for a voice service is just a GBR service request because the voice service must use a specific bandwidth uninterruptedly to transmit packets and has less tolerance to interruption of the packet transmission. Therefore, the femtocell must provide GBR wireless network resources. As another example, a service request for an Internet accessing service is just a non-GBR service request because the Internet accessing service has more tolerance to interruption of the packet transmission (i.e., webpage packets need not to be transmitted uninterruptedly as long as they can be transmitted within a specific time period). Therefore, it is unnecessary for the femtocell to provide GBR wireless network resources.

Additionally, in accordance with the LTE specification, QoSs requested by the request signals may be sub-divided into nine priority levels, and different priority levels correspond to different data rate requirements and delay limits. Therefore, priority levels of individual request signals can be determined in accordance with the LTE specification.

After having determined that the femtocell 13 is able to provide the bandwidth and the QoS class requested by the request signal 110 and process the request signal 110 within the waiting time $D_{QCI(110)}$, the processing unit 133 of the femtocell 13 schedules the request signal 110 into the queue. Next, the processing unit 133 chooses a request signal having a high priority level according to the priority levels of the request signals in the queue, and appends an ID of the femtocell 13 to the request signal having the high priority level. Then, the processing unit 133 transmits the request signal having the high priority level to the femtocell management apparatus 15 via the transceiving unit 131 so that the femtocell management apparatus 15 can learn that the received request signal is transmitted from the femtocell 13 and then perform the subsequent wireless network resource allocation.

In this embodiment, the processing unit 133 transmits the request signal 110 and the interference figure 130 to the femtocell management apparatus 15 and then the femtocell management apparatus 15 allocates the wireless network resources. Hereinafter, how the femtocell management apparatus 15 allocates the wireless network resources will be detailed. It shall be noted at first that, in this embodiment, the network system 1 adopts the Orthogonal Frequency Division Multiple Access (OFDMA) wireless communication system standard, which is a multiple access architecture utilizing the frequency domain and the time domain in combination. Therefore, mutual interference between signals from different users can be avoided as long as the wireless network resources are appropriately allocated in both the frequency domain and the time domain.

In order to allocate the wireless network resources in the frequency domain and the time domain, a resource block (RB) must be defined at first. Specifically, a resource block refers to a unit bandwidth in the frequency domain and a unit time in the time domain. For example, in this embodiment, each resource block is defined as a bandwidth of 2 megabits per second (Mbps) in the frequency domain and a time of 0.1 microsecond (ms) in the time domain; i.e., a resource block refers to use of a bandwidth of 2 Mbps for 0.1 ms. Accordingly, the wireless network resource allocation performed by the femtocell management apparatus 15 is just allocation of resource blocks.

Generally speaking, the femtocell management apparatus 15 has a plurality of resource blocks and is configured to manage a plurality of femtocells. Each of the femtocells can receive request signals transmitted by one or more UEs, and transmit the received request signals and an interference figure that it establishes to the femtocell management apparatus 15. Then, the femtocell management apparatus 15 allocates the resource blocks to the individual request signals according to the received request signals and the interference figures of the femtocells.

In this embodiment, after the request signal 110 and the interference figure 130 are received by the transceiving unit 151 of the femtocell management apparatus 15, the transceiving unit 151 transmits the request signal 110 and the interference figure 130 to the processing unit 153 so that the processing unit 153 determines an available resource block amount m that can be allocated to the request signal 110. Specifically, because there are other femtocells A-E that may interfere with the femtocell 13 in an area around the femtocell 13, the femtocell management apparatus 15 must exclude resource blocks that are used by the femtocells A-E and interfere with the femtocell 13 according to the interference figure 130 in determining the available resource block amount m.

As described above, the request signal 110 comprises the request bandwidth and the QCI, which correspond to a request resource block amount δ; i.e., the request signal 110 is to request δ resource blocks. Then, the processing unit 153 determines whether the available resource block amount m is not less than the request resource block amount δ. If "yes" (i.e., m≥δ), then the processing unit 153 allocates δ resource blocks out of the available resource blocks to the request signal 110. Otherwise, if "no" (i.e., m<δ), then the processing unit 153 determines whether the request signal 110 is of a GBR service request according to the QCI of the request signal 110. For the latter determination, if "no" (i.e., the request signal 110 is of a non-GBR service request), then the processing unit 153 allocates m available resource blocks to the request signal 110. Otherwise, if "yes" (i.e., currently the femtocell management apparatus 15 is unable to provide the service requested by the request signal 110), then the processing unit 153 temporarily does not allocate any resource blocks to the request signal 110 and, instead, transmits the request signal 110 back to the queue to wait for a next allocation process.

After having allocated the δ or m resource blocks to the request signal 110, the processing unit 153 generates an allocation result 150 and transmits the allocation result 150 to the femtocell 13 via the transceiving unit 151. Then, the femtocell 13 transmits the allocation result 150 to the user equipment 11 via the transceiving unit 151 so that the femtocell 13 can perform signal transmissions with the user equipment 11 according to the allocation result 150.

Figure 4:
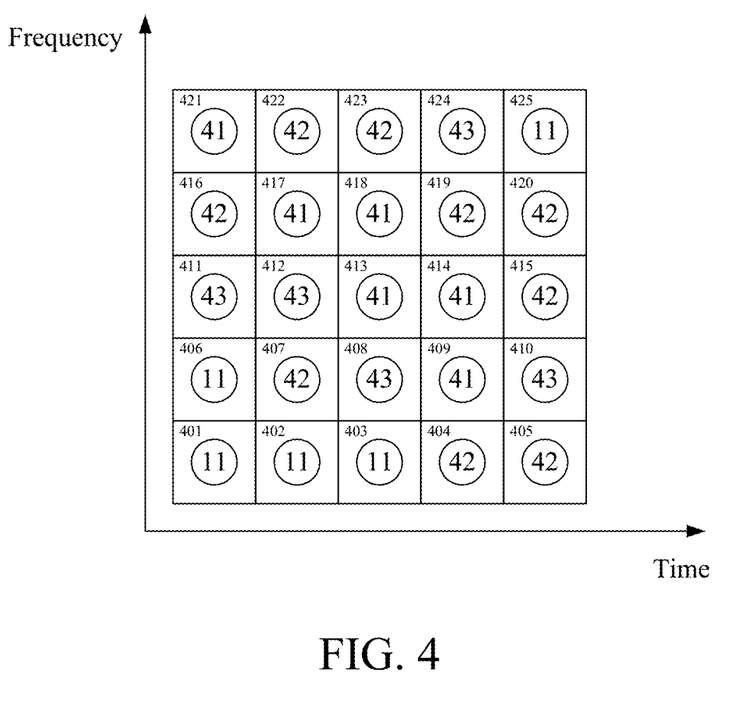
FIG. 4 is a schematic view depicting a resource block allocation result.

Referring to FIG. 4, a schematic view illustrating a resource block allocation result is shown, where the horizontal axis represents the time and the vertical axis represents the frequency. In an example, assume that request signals from four UEs (e.g., a user equipment 11, a user equipment 41, a user equipment 42 and a user equipment 43) are received by the femtocell management apparatus 15. Then the femtocell management apparatus 15 performs the wireless network resource allocation in the aforesaid manner and generates an allocation result as shown in FIG. 4. In this case, twenty five resource blocks are allocated by the femtocell management apparatus 15, which are resource blocks 401-425 respectively. Here, a number labeled at the center of each resource block indicates the user equipment to which is resource block is allocated. For example, the femtocell management apparatus 15 allocates the resource blocks 401-403, 406 and 425 to the user equipment 11, allocates the resource blocks 409, 413-414, 417-418 and 421 to the user equipment 41, and so on. Thus, the user equipment 11 and the femtocell 13 can transmit signals according to the resource blocks 401-403, 406 and 425.

Once a resource block has been used, the processing unit 153 of the femtocell management apparatus 15 transforms the used resource block into an available resource block so that, when a new request signal requests a service, the used resource block can be re-allocated to the new request signal. Thus, the resource block can be reused to effectively improve the utilization factor of the wireless network resources.

It shall be particularly appreciated that, in this embodiment, a resource block is defined as a bandwidth of 2 Mbps in the frequency domain and a time of 0.1 ms in the time domain. However, in other embodiments, a resource block may also be defined as other values in the frequency domain and in the time domain depending on requirements in practical applications. It is not limited to the bandwidth of 2 Mbps and the time of 0.1 ms. Furthermore, the resource allocation result shown in FIG. 4 is only provided for illustration purpose, so the frequency range and the time range are not indicated therein; however, in practical applications, each resource block may correspond to a specific frequency range and a specific time range depending on the operational frequency band of the network system, and this is not intended to limit the scope of the present invention.

According to the above descriptions, the femtocell only needs to perform signal transmissions and to transmit a broadcast signal once when establishing the interference figure and needs not to make complex computations for obviating the interference. Therefore, the femtocell can be simply equipped with a low-cost processing unit to remarkably lower the hardware cost of the femtocell. On the other hand, by enabling the femtocell management apparatus to dynamically allocate and reuse each of the resource blocks, the utilization factor of the wireless network resources can be effectively improved to minimize consumption of the wireless network resources and to allow for processing of a large number of service requests that are received simultaneously. Meanwhile, this also guarantees the connection quality of the UEs.

A second embodiment of the present invention is a resource allocation method for the network system described in the first embodiment. The network system comprises a user equipment, a femtocell and a femtocell management apparatus. The femtocell is adapted to communicate with the user equipment and the femtocell management apparatus respectively, and the user equipment transmits a request signal to the femtocell. The request signal comprises a request bandwidth and a request QoS, which may correspond to a request resource block amount δ; furthermore, the request signal has waiting time, and the femtocell has a queue waiting period.

Additionally, the resource allocation method described in the second embodiment may be implemented by a computer program product. When the computer program product is loaded into the network system via a computer and a plurality of codes comprised in the computer program product is executed, the resource allocation method described in the second embodiment can be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

Figure 5A:
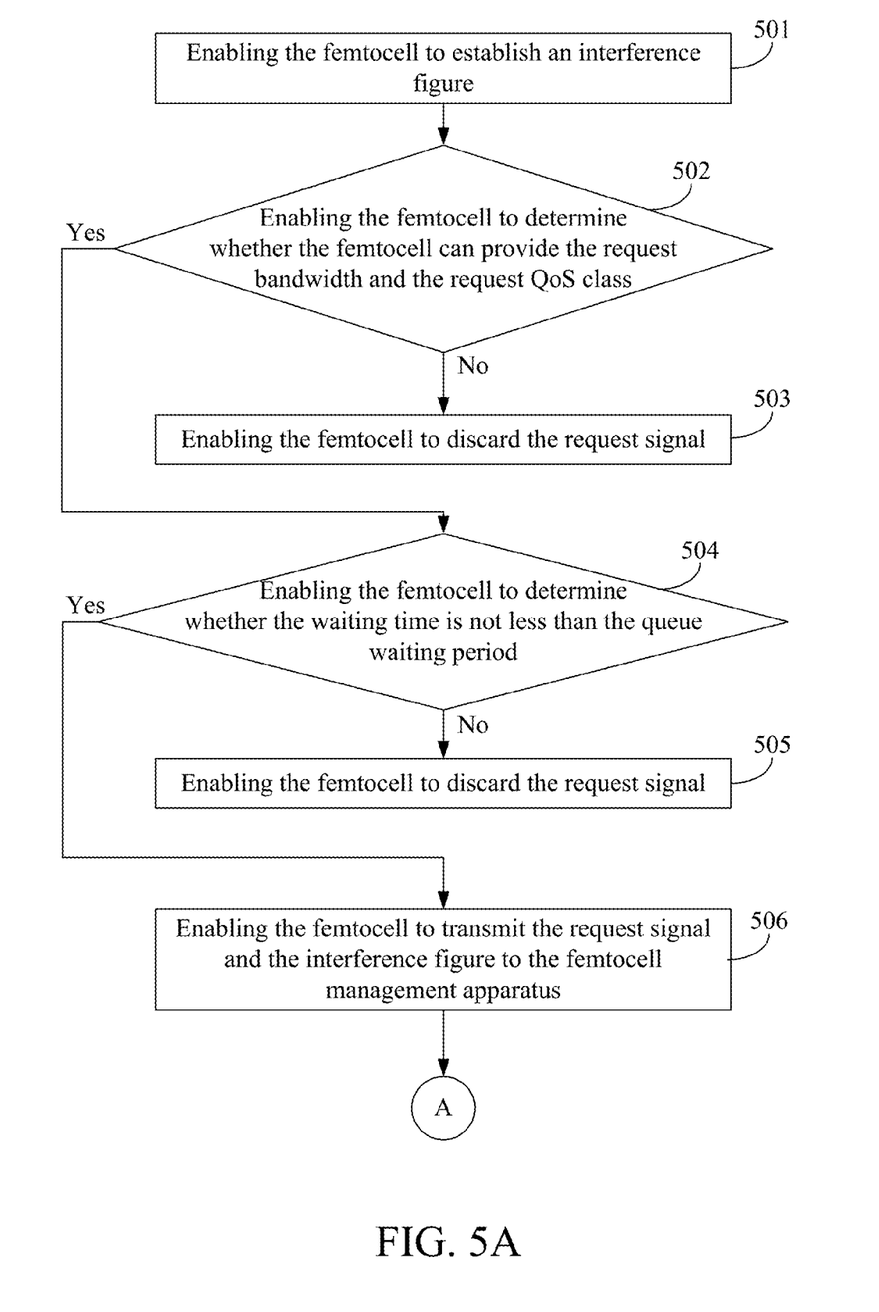
FIGS. 5A-5B depict a flowchart diagram of a second embodiment of the present invention.
Figure 5B:
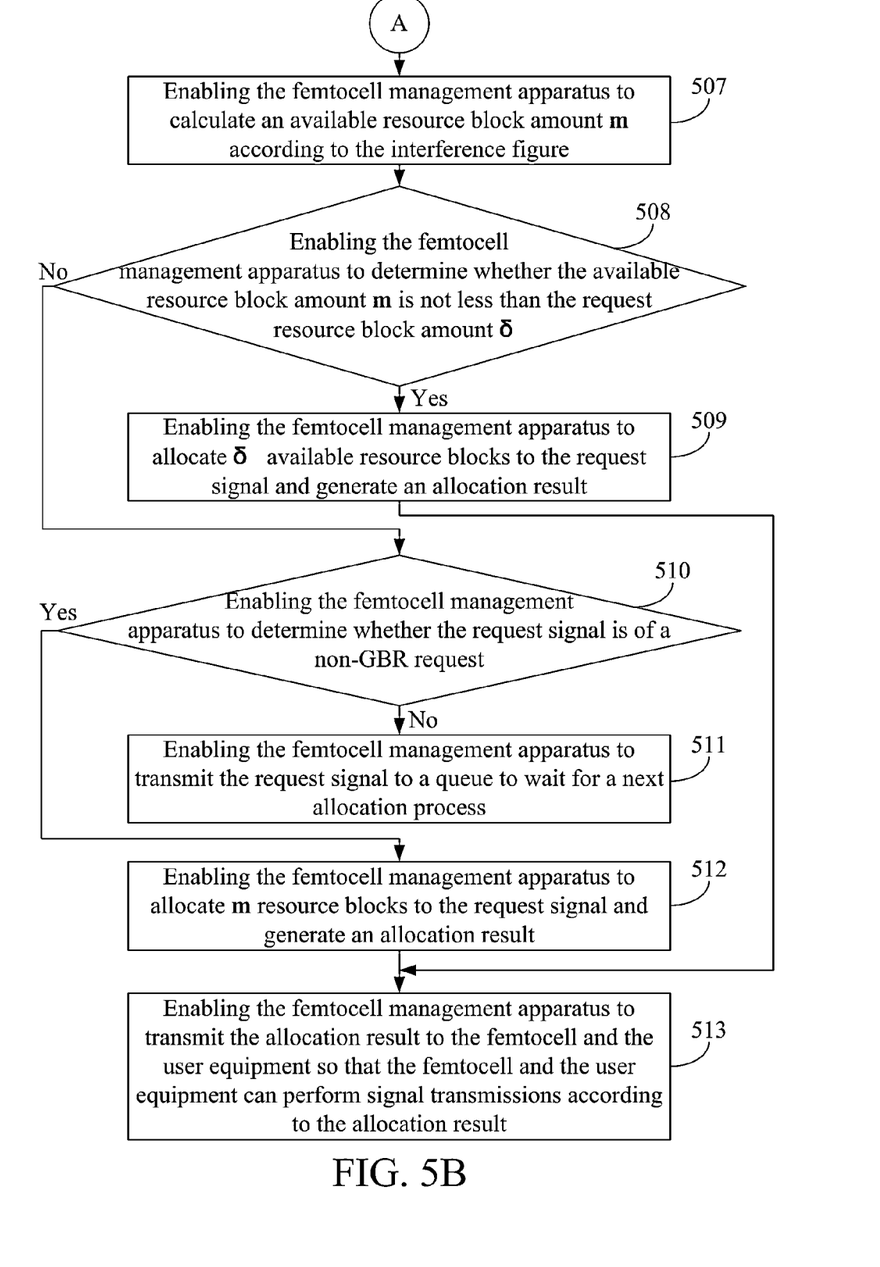

FIGS. 5A and 5B depict a flowchart diagram of the resource allocation method of the second embodiment. Firstly, step 501 is executed to enable the femtocell to establish an interference figure. Then, step 502 is executed to enable the femtocell to determine whether the femtocell can provide the request bandwidth and the request QoS class. If "no", step 503 is executed to enable the femtocell to discard the request signal. Otherwise, if "yes", step 504 is executed to enable the femtocell to determine whether the waiting time is not less than the queue waiting period. For the latter determination, if "no", step 505 is executed to enable the femtocell to discard the request signal. Otherwise, if "yes", step 506 is executed to enable the femtocell to transmit the request signal and the interference figure to the femtocell management apparatus.

Next, step 507 is executed to enable the femtocell management apparatus to calculate an available resource block amount m according to the interference figure. Step 508 is executed to enable the femtocell management apparatus to determine whether the available resource block amount m is not less than the request resource block amount δ. If "yes", step 509 is executed to enable the femtocell management apparatus to allocate δ available resource blocks to the request signal and generate an allocation result. Thereafter, step 513 is executed to enable the femtocell management apparatus to transmit the allocation result to the femtocell and the user equipment so that the femtocell and the user equipment can perform signal transmissions according to the allocation result.

Otherwise, if "no", step 510 is executed to enable the femtocell management apparatus to determine whether the request signal is of a non-GBR request. For the latter determination, if "no", then step 511 is executed to enable the femtocell management apparatus to transmit the request signal to a queue to wait for a next allocation process. otherwise, if "yes", then step 512 is executed to enable the femtocell management apparatus to allocate m resource blocks to the request signal and generate an allocation result. Next, step 513 is executed to enable the femtocell management apparatus to transmit the allocation result to the femtocell and the user equipment so that the femtocell and the user equipment can perform signal transmissions according to the allocation result.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, the network system of the present invention uses the femtocell to establish an interference figure and transmit the interference figure and a request signal, which is transmitted by a user equipment, to the femtocell management apparatus. Then, the femtocell management apparatus performs wireless network resource allocation to allocate a resource block to the request signal so that the femtocell and the user equipment can perform signal transmissions according to the resource block. Thereby, the present invention can overcome the problems with the prior art that the femtocell bears a heavy computational burden and requires additional cost for making complex computations and that it is impossible to effectively allocate resources in areas where femtocells are densely distributed. Meanwhile, the present invention can advantageously (1) reduce the cost of the femtocell, (2) improve the utilization factor of resources in the whole network, (2) minimize consumption of the network resources, (4) process service requests from a large amount of UEs, and (5) ensure the connection quality of the UEs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network system, comprising:
    a user equipment, being configured to transmit a request signal having a waiting time;
    a femtocell, having a queue waiting period, communicating with the user equipment and being configured to receive the request signal to establish an interference figure; and
    a femtocell management apparatus, communicating with the femtocell and being configured to receive the request signal and the interference figure, perform resource allocation to allocate a resource block to the request signal according to the request signal and the interference figure so that the femtocell and the user equipment perform signal transmission according to the resource block;
    wherein the femtocell transmits the request signal and the interference figure to the femtocell management apparatus after determining that the waiting time is not less than the queue waiting period.

2. The network system as claimed in claim 1, wherein the request signal comprises a request bandwidth and a request quality of service (QoS), the femtocell is further configured to transmit the request signal and the interference figure to the femtocell management apparatus after determining that the femtocell can provide the request bandwidth and the request QoS.

3. The network system as claimed in claim 1, wherein the interference figure records a distance between at least one neighbor femtocell and the femtocell.

4. The network system as claimed in claim 1, wherein the request signal requests an request resource block amount, the femtocell management apparatus is further configured to calculate an available resource block amount according to the interference figure, and allocate the resource block to the request signal after determining that the available resource block amount is not less than the request resource block amount.

5. The network system as claimed in claim 1, wherein the request signal requests an request resource block amount, the femtocell management apparatus is further configured to calculate an available resource block amount according to the interference figure, and allocate the resource block to the request signal after determining that the available resource block amount is less than the request resource block amount and determining that the request signal belongs to a non-guaranteed bit rate request.

6. A femtocell, being adapted to communicate with at least one neighbor femtocell, a user equipment and a femtocell management apparatus, the user equipment being configured to transmit a request signal to the femtocell, a request signal having a waiting time, and the femtocell comprising:
    a transceiving unit, being configured to transmit a broadcast signal to the at least one neighbor femtocell so that the at least one neighbor femtocell transmits a feedback signal to the femtocell in response to the broadcast signal; and
    a processing unit, being configured to establish an interference figure according to the feedback signal;
    wherein the interference figure records a distance between the at least one neighbor femtocell and the femtocell, and the processing unit further calculates a queue waiting period and transmits the request signal and the interference figure to the femtocell management apparatus after determining that the waiting time is not less than the queue waiting period.

7. The femtocell as claimed in claim 6, wherein the femtocell is further adapted to communicate with a user equipment and a femtocell management apparatus, the user equipment transmits a request signal to the femtocell, the request signal comprises a request bandwidth and a request QoS, the processing unit is further configured to transmit the request signal and the interference figure to the femtocell management apparatus after determining that the femtocell can provide the request bandwidth and the request QoS.

8. A femtocell management apparatus, being adapted to communicate with a femtocell having a queue waiting period, comprising:
    a transceiving unit, being configured to receive a request signal having a waiting time and an interference figure from the femtocell after the femtocell determines that the waiting time is not less than the queue waiting period; and
    a processing unit, being configured to perform resource allocation to allocate a resource block to the request signal according to the request signal and the interference figure so that the femtocell performs signal transmission according to the resource block, wherein the request signal requests a request resource block amount, the processing unit is further configured to calculate a available resource block amount according to the interference figure and allocate the resource block to the request signal after determining that the available resource block amount is not less than the request resource block amount.

9. A femtocell management apparatus, being adapted to communicate with a femtocell having a queue waiting period, comprising:
a transceiving unit, being configured to receive a request signal having a waiting time and an interference figure from the femtocell after the femtocell determines that the waiting time is not less than the queue waiting period; and
a processing unit, being configured to perform resource allocation to allocate a resource block to the request signal according to the request signal and the interference figure so that the femtocell performs signal transmission according to the resource block,
wherein the request signal requests an request resource block amount, the processing unit is further configured to calculate an available resource block amount according to the interference figure, and allocate the resource block to the request signal after determining that the available resource block amount is less than the request resource block amount and determining that the request signal belongs to a non-guaranteed bit rate request.

10. A resource allocation method for a network system, the network system comprising a user equipment, a femtocell and a femtocell management apparatus, the femtocell having a queue waiting period and being adapted to communicate with the user equipment and the femtocell management apparatus respectively, the user equipment transmitting a request signal to the femtocell, the request signal comprising a request bandwidth and a request QoS and having a waiting time, the resource allocation method comprising the steps of:
(a) enabling the femtocell to establish an interference figure;
(a1) enabling the femtocell to determine that the femtocell can provide the request bandwidth and the request QoS;
(a2) enabling the femtocell to determine that the waiting time is not less than the queue waiting period;
(b) enabling the femtocell to transmit the request signal and the interference figure to the femtocell management apparatus; and
(c) enabling the femtocell management apparatus to perform resource allocation to allocate a resource block to the request signal according to the request signal and the interference figure so that the femtocell and the user equipment perform signal transmission according to the resource block.

11. The resource allocation method as claimed in claim 10, wherein the request signal requests a request resource block amount, the step (c) is a step of enabling the femtocell management apparatus to calculate an available resource block amount according to the interference figure, and allocate the resource block to the request signal after determining that the available resource block amount is not less than the request resource block amount.

12. The resource allocation method as claimed in claim 10, wherein the request signal requests a request resource block amount, the step (c) is a step of enabling the femtocell management apparatus to calculate an available resource block amount according to the interference figure, and allocate the resource block to the request signal after determining that the available resource block amount is less than the request resource block amount and determining that the request signal belongs to a non-guaranteed bit rate request.

13. A non-transitory machine-readable medium, being stored a program of a resource allocation method for a network system, the network system comprising a user equipment, a femtocell and a femtocell management apparatus, the femtocell being adapted to communicate with the user equipment and the femtocell management apparatus respectively, the user equipment transmitting a request signal to the femtocell, the request signal comprising a request bandwidth and a request QoS and having a waiting time, the femtocell having a queue waiting period, the program comprising:
a code A for enabling the femtocell to establish an interference figure;
a code A1 for enabling the femtocell to determine that the femtocell can provide the request bandwidth and the request QoS;
a code A2 for enabling the femtocell to determine that the waiting time is not less than the queue waiting period;
a code B for enabling the femtocell to transmit the request signal and the interference figure to the femtocell management apparatus; and
a code C for enabling the femtocell management apparatus to perform resource allocation to allocate a resource block to the request signal according to the request signal and the interference figure so that the femtocell and the user equipment perform signal transmission according to the resource block.

14. The non-transitory machine-readable medium as claimed in claim 13, wherein the request signal requests a request resource block amount, the code C is a code for enabling the femtocell management apparatus to calculate an available resource block amount according to the interference figure, and allocate the resource block to the request signal after determining that the available resource block amount is not less than the request resource block amount.

15. The non-transitory machine-readable medium as claimed in claim 13, wherein the request signal requests a request resource block amount, the code C is a code for enabling the femtocell management apparatus to calculate an available resource block amount according to the interference figure, and allocate the resource block to the request signal after determining that the available resource block amount is less than the request resource block amount and determining that the request signal belongs to a non-guaranteed bit rate request.

* * * * *